US011805164B2

(12) United States Patent
Du (10) Patent No.: US 11,805,164 B2
(45) Date of Patent: Oct. 31, 2023

(54) SYSTEMS AND METHODS OF TRACKING THE DELIVERY AND POST-DELIVERY STATUS FOR ELECTROMAGNETICALLY TRANSMISSIBLE CONTENTS DELIVERED VIA USER INITIATED AND CONTROLLED HYBRID DELIVERY MODES WITH THE CONTINUING INTERPLAY OF AN ADDRESS-LINKED MACHINE-READABLE CODE SYSTEM WITH ANALYTICAL FUNCTIONAL MODULES

(71) Applicant: Lee Du, Palo Alto, CA (US)

(72) Inventor: Lee Du, Palo Alto, CA (US)

(73) Assignee: Lee Du, Palo Alto, CA (US)

( * ) Notice: Subject to any disclaimer, the term of this patent is extended or adjusted under 35 U.S.C. 154(b) by 0 days.

(21) Appl. No.: 17/976,868

(22) Filed: Oct. 30, 2022

(65) Prior Publication Data

US 2023/0121516 A1 Apr. 20, 2023

Related U.S. Application Data (63) Continuation-in-part of application No. 17/221,811, filed on Apr. 4, 2021, now Pat. No. 11,489,912.

(51) Int. Cl.
*H04L 67/06* (2022.01)
*H04L 51/066* (2022.01)
*H04L 51/234* (2022.01)

(52) U.S. Cl.
CPC ............ *H04L 67/06* (2013.01); *H04L 51/066* (2013.01); *H04L 51/234* (2022.05)

(58) Field of Classification Search
CPC ..... H04L 51/42; H04L 51/234; G06Q 10/083; G06Q 10/0833; H04W 4/021; H04W 4/029; H04W 4/12
See application file for complete search history.

(56) References Cited

U.S. PATENT DOCUMENTS

2007/0146777 A1\* 6/2007 Cranitch ............ H04N 21/4117
358/1.15
2011/0087746 A1\* 4/2011 Sagi ..................... G06Q 10/107
709/206

(Continued)

*Primary Examiner* — Chirag R Patel
(74) *Attorney, Agent, or Firm* — Bo-In Lin (57) ABSTRACT

The present invention discloses a network communication system that includes an AFM-enabled network processing center for receiving and converting an electronic or electromagnetically transmissible data/content into a physically deliverable object and/or network transmissible content data files for carrying out a hybrid delivery of the data/content by a physical delivery process and/or a network electro-magnetic delivery process to a recipient or an ECRMA. A machine-readable code such as QR code is used in the continuous information flow among the various components of this system. This unique machine-readable code is associated with multiple kinds of address-linked information, user-related personally identifiable information or biometric information. This code also embodies some derivative component(s) which can be individually accessed and manipulated. This code also reflects, by the various analytical functional module implemented in this system, improved features from the interactions between the sender and the recipient. The delivery status of the electronic contents or the tangible item and their post-delivery activities are tracked by a variety of mechanisms and the information obtained from the tracking is send back to the content-senders. The continuous communication between the content sender and recipient is enabled through the AFM-enabled system and the related unique machine-readable code.

2 Claims, 9 Drawing Sheets

(56) References Cited

U.S. PATENT DOCUMENTS

| | | | |
|---|---|---|---|
| 2012/0179606 A1* | 7/2012 | Sagi | G06Q 10/107 |
| | | | 705/40 |
| 2012/0179766 A1* | 7/2012 | Gracy | G06Q 10/107 |
| | | | 709/206 |
| 2013/0198300 A1* | 8/2013 | Briggman | G06Q 10/1093 |
| | | | 709/206 |

* cited by examiner

SYSTEMS AND METHODS OF TRACKING THE DELIVERY AND POST-DELIVERY STATUS FOR ELECTROMAGNETICALLY TRANSMISSIBLE CONTENTS DELIVERED VIA USER INITIATED AND CONTROLLED HYBRID DELIVERY MODES WITH THE CONTINUING INTERPLAY OF AN ADDRESS-LINKED MACHINE-READABLE CODE SYSTEM WITH ANALYTICAL FUNCTIONAL MODULES

This application is a Continuation-in-Part Application (CIP) of a co-pending Non-Provisional application Ser. No. 17/221,811 that is filed on Apr. 4, 2021. Application Ser. No. 17/221,811 is a Continuation-in-Part Application (CIP) of a co-pending Non-Provisional application Ser. No. 15/076,282 that is filed on Mar. 21, 2016, and application Ser. No. 15/076,282 is a Continuation in Part (CIP) Application of application Ser. No. 12/077,105 that was filed on Mar. 17, 2008 by the Applicant of this Application. Application Ser. No. 12/077,105 claims a priority of Oct. 1, 2007 of a provisional Patent Application 60/997,252. The disclosures made in U.S. Ser. No. 12/077,105 and 60/997,252 are hereby incorporated by reference in the present patent application. Furthermore, this Application is a Continuation-in-Part Application (CIP) of a co-pending Non-Provisional application Ser. No. 12/928,984 filed on Dec. 24, 2010 claim a Priority of a Provisional Application 61/284,897 that was filed on Dec. 28, 2009 by the Applicant of this Application. The disclosures made in applications Ser. Nos. 12/928,984 and 61/284,897 are hereby incorporated by reference in this Patent Application.

BACKGROUND OF THE INVENTION

1. Field of the Invention

This invention relates generally to the systems and methods for tracking and obtaining feedbacks for electro-magnetically transmissible contents (e-TC) delivered in an array of hybrid modes of content deliveries from a sender to the designated recipient. More particularly, this invention is related to methods and network systems implemented with a machine-readable code (MRC) system to allow a sender to control, monitor and track the delivery of either an article that embodies the -electronically-transmissible contents (e-TC) or the delivery of a tangible item which carries the specific MRC to designated recipients, or the delivery to different functional apparatus that embodies the said contents to designated recipients while providing feedback information to the sender and allowing continuing interplay, aided by the analytical functional module (AFM), between the sender and the designated recipient.

2. Description of the Related Art

Electronically transmissible contents (e-TC) such as e-ads transmitted through the Internet are efficient and convenient to be spread and are used more often. However, the delivery format of e-TC through Internet has the limitation of its capability to reach the group of people who have no, limited or interrupted Internet access. A further limitation of delivering e-TC over the Internet is the lack of information over the recipient's geographic and other status.

In the field of advertising, both printed ads and e-ads have the limitation in that there are no processes for monitoring the customer's buying decision, i.e., the conversion rate.

Once the printed ads and/or the e-ads are sent, the advertiser has very little information with which to assess the effectiveness of the advertisements due to the limited amount of information the advertiser can collect about the customer's access status and response to the advertisements delivered either by mail or by Internet.

In a broader sense, when e-TC is received through either the Internet or non-Internet routes, and then accessed in the off-line environment, i.e., not directly connected with the Internet, it remains unknown to the advertiser as the e-TC sender how the e-TC is accessed or manipulated in various ways. Therefore, it is difficult to assess how much effort and financial resources are either effective or wasted by sending out e-TC as advertisements to large numbers of recipients (receivers) while receiving in return a very limited amount of information about recipient's response to these advertisements.

In addition, in the Internet age, the large amount e-TC, as well as tangibles such as printed information or parcels can flood a recipient. In the Patent (U.S. Pat. No. 10,515,376), a single machine-readable code (MRC) is disclosed as the gateway to all the information addressed to a recipient.

Once the recipient receives this specific code, it can be processed in a variety of ways.

(1) Access of this MRC can lead to a website or platform where all the information addressed to that recipient is stored and can be accessed in different manners, or (2) This MRC can be accessed by an ECRMA (Electronic Content Receiving/Managing Apparatus)

This MRC is address-specific in that it may be accessed only by the recipient who has proven representation of a given physical address, or an address linked in a variety of ways to that physical address such as a virtual postal address, etc. An address-linked mechanism (ALM) is one of the features of this MRC, e.g., when the recipient scans or accesses the MRC, the resulted response will ask for some information which are linked to the updated address/location of the recipient, such as the cellphone number that is linked to this address, the current location as the scanning or access to this MRC occurs, the 'user ID' assigned to this specific address, etc.

When the user (sender) sends out the request which may involve the MRC to be generated, the ALM is part of the process.

The information of previous, current and subsequent locations can be obtained through a variety of ways, for example, by the location tracking mechanism in the smart phone or in the ECRMA, by the recipient-initiated update process, etc.

Either the sender or the recipient can define where and how the access of the MRC can be allowed. For example, it can be defined that the access can be allowed only at one or more given physical address(es), as would be verified by the ECRMA used to access the MRC.

This MRC can be continuously updated or modified, aided by various functionalities of analytic functional module (AFM) providing analysis results of post-delivery activities from different categories of recipients after the sender has initiated this process.

In addition to the ALM to control the access of the MRC, other ways can be used by the sender or recipient. For example, a voice-recognition authentication is required to allow a specific user to access the MRC.

The tangible deliverable can be a printed item that is usually carried and delivered through the postal system. This item will have a specific MRC, as described in U.S. Pat. No. 10,515,376, to enable the communication between the sender and the receiver.

The tangible deliverable can also be a parcel that is usually carried and delivered through the postal system or other package delivery services. This parcel will have a specific MRC, as described in U.S. Pat. No. 10,515,376, to enable the communication between the sender and the receiver.

The tangible deliverable can also have a chip, we call it an Internet of Things device (ITD), attached to it. With the ITD, the tracking of the delivery and post-delivery activities can be continuous. Further, the communication between the ITD and the processing unit/center is an ongoing process, ensuring continual modification of the tracking parameters, etc.

Thus, the communication among the three delivery routes, the tangible with the ITD, the ECRMA and the MRC, are made available and continuous, with the integration of ALM among them. It is noted that the MRC can be sent with the tangible (e.g., a printed sheet or a parcel) or sent to the ECRMA.

In this Continuation-in-Part Application (CIP), the features of the MRC, the ALM and their interaction with the analytic functional module (AFM) providing analysis results of post-delivery activities from different categories of recipients are further defined and explained in several related instances.

Therefore, a need exists in the art of obtaining continuous feedback and communication for e-TC via the hybrid delivery modes to provide improved system configuration to dynamically and intelligently continue the post-delivery tracking and communicating status of e-TC and to represent all the e-TC to a given ALM-related recipient in a more controllable and intelligent way by a machine-readable code (MRC) such as QR code.

SUMMARY OF THE PRESENT INVENTION

It is an aspect of this invention to provide a system and a method by implementing a machine-readable code (MRC) to address the problems that large amount e-TC and tangible deliverable objects such as printed advertisements and parcels are received on a daily basis. Most of the households are flooded and overwhelmed by large amounts of unsolicited mails in addition to the large amount of e-TC transmitted over the networks. The confirmation of a parcel arrived or received to the recipient is usually redundant and inefficient. The machine-readable code (MRC) is implemented as the gateway to all the information addressed to a recipient such that the above-mentioned problems can be resolved.

Specifically, it is an aspect of this invention that when the recipient receives this specific code, the recipient can process the information in a variety of ways. The delivery agent of a tangible printed matter or a parcel can access this specific code to notify the recipient of the delivery status of this tangible printed matter or a parcel. The delivery agent of a tangible parcel with the IOT attached can also access this specific code to notify the recipient of the delivery status of this tangible parcel. Access of this MRC can lead to a website where all the relevant information of this delivery addressed to that recipient is stored and can be accessed in many ways. Alternately, the MRC can be applied to access an ECRMA that provide wide varieties of process options.

In order to accurately provide MRC with the location information, the location's latitude, longitude, and altitude are all included as obtained from GPS or/and other available localization technologies. Thus, the location is a 3-dimentional representation. A useful situation is that a mail recipient lives in an apartment on the 3rd floor while another mail recipient lives on the 2nd floor of the same building. Though the latitude and longitude of the two persons are the same, but their altitude are different to distinguish their different location information as reflected in their different MRCs.

One of the dynamic features of the MRC is its timestamp component. This timestamp component is added at the time the MRC is generated. Each time any update is added to the MRC either by the sender or the recipient of the MRC, the timestamp component is also updated. Therefore, each updated MRC is unique due to its specific timestamp and the associated contents at that specific time. This feature is useful for both the sender and recipient in analyzing the specific information of a given MRC in an MRC series originated from one MRC. The series of MRCs can be integrated into a blockchain to facilitate the use of the information contained.

To periodically check the MRC-specified location, different ECRMAs can be used for this purpose. Usually a cellphone can be used for this purpose. GPS or/and other available localization technologies can be used to verify the cellphone's location is compatible with the MRC-specified location. At a higher security level, a request can be made to include more ECRMAs used to verify the MRC-specified location. For example, a laptop, the Wi-Fi router, other ECRMAs connected to the same Wi-Fi router. And a special ECRMA can be sent from the e-TC sender or a third party to the recipient for this purpose.

Frequently, there exists a distance from the mailbox to the physical location where the recipient dwells. This distance is also included in the location information of the MRC. The MRC will contain the 3-D location information of the mailbox and the 3-D information of recipient's dwelling place. A useful situation is that in the same building, one person lives on the 2nd floor apartment and another one lives on the 3rd floor apartment. Both persons go to the first-floor mailbox area to get their mails. Their mailboxes are located next to each other. Their MRC's 3-D location information will not only distinguish them from their 3-D dwelling location information, but also the 3-D information from the mailbox area to their dwelling places.

In the case of a virtual mailing/postal address system, one or more of the actual physical addresses of the virtual address system will be used in the location information of the MRC. Which physical address is used can be set up by the virtual address system or by a designated agent. This is useful for mail systems who elect to disclose selected one or more physical address from their own arrangement, such as the virtual or mail systems of curtain businesses, government, military, etc.

As in our prior invention (U.S. Pat. No. 10,515,376), the MRC is usually presented in the form of an MRC complex (MRCC). Many third party MRCs currently in use are of the static MRC type. Therefore, this invention includes a protocol to convert a static MRC into the MRCC. The dynamic component can be added or reserved after the static MRC is converted into an MRCC. Though the MRCC can be displayed as one unit, it will have a static component and a dynamic component which may or may not have curtain e-TC.

Also, as in our prior invention (U.S. Pat. No. 10,515,376), the dynamic component of the MRCC incorporates the updated information from both the e-TC sender and the e-TC recipient. The processing center analyzes this continuous process, incorporates the inputs from both the e-TC sender and the e-TC recipient, and generates new MRCC in an intelligent way, resulting in a more personalized MRCC as well as MRC to the recipient, in the situation of business to customer relationship, producing a more friendly, personalized and improved customer experience (Cx).

The ALM associated with the MRC may also include Personally Identifiable Information (PII). This will make the MRC to be more unique with increased security level. The name of the recipient is part of the PII. At the discretion of the recipient, more contents of PII can be added. When the sender sends the e-TC via the control center to the recipient, the unique MRC will be associated with the PII of the recipient. Upon confirmation of the PII which corresponds to the PII of the designated recipient, the e-TC represented by the MRC can be accessed. And subsequent communication between the sender and the recipient can be established.

Similarly, the ALM associated with the MRC may also include biometric information (BI) of the recipient. This will make the MRC to be more unique with increased security level. The biometric information, such as fingerprint, voice recognition, or facial recognition, etc., will be chosen upon the agreement between the sender and the recipient, or between the recipient and the control center. When the sender sends the e-TC via the control center to the recipient, the unique MRC will be associated with the biometric information of the recipient. Upon confirmation of the biometric information which corresponds to the biometric information of the designated recipient, the e-TC represented by the MRC can be accessed. And subsequent communication between the sender and the recipient can be established.

That each mailing address has a unique MRC is a feature of this invention. This unique MRC can yield one or more unique derivative MRC (dMRC) which can be a simpler form and can be obtained for general or public use. The dMRC may have only the information of the mailing address and generally has no information of the PII or the biometric information of the recipient. However, the dMRC is linked by the control center to the higher level of the MRC at that mailing address with more information of the recipient such as the PII or the biometric information of the recipient. The e-TC recipient at a given mailing address can give the dMRC with selected added information to someone. This is useful for social network wherein the connection will be 'by invitation only' from the dMRC with selected added information. Another use can be for a mailing address with more than one mail recipients, such as several people share a multiroom property and share the same physical mailbox, each person can have a unique dMRC under that physical mailbox so that tangible deliveries (mails or parcels) or e-TC can be sent to a specific person in that multiroom property.

There are usually multiple people in a business or establishment with one single mailing address. Each person in this mailing address can set up a unique dMRC. This unique, personalized dMRC enables tangible deliveries (mails or parcels) or e-TC be sent to a designated recipient.

In the situation of a virtual mailing group with multiple recipients in a group, each person in this virtual mailing address can set up a unique dMRC. This unique, personalized dMRC enables tangible deliveries (mails or parcels) or e-TC be sent to a designated recipient in this virtual mailing group.

Another use of the dMRC is in the use of coupons. A coupon usually has a coupon code and a validation date. This information can be represented by a dMRC of a coupon which can be represented by an MRC. The dMRC representing the coupon code and a validation date can be separately arranged, programmed, and manipulated to facilitate its use in the actual offline and online purchasing (redeeming) process.

The dMRC can also be used for the confirmation of a tangible delivery to the designated recipient. When the tangible delivery arrived, the delivery agent can use the dMRC of the recipient plus the information of the tangible delivery to inform the MRC control center. Then the MRC control center can notify the recipient the status of the delivery.

Another aspect of this invention is to implement the MRC as an address-specific code. This address-specific code can be used only by the recipient who has proven representation of a given physical address, or an address linked in a variety of ways to that physical address such as a virtual postal address, etc. An address-linked mechanism (ALM) is one of the features of this MRC, e.g., when the recipient scans or access the MRC, the MRC responds by asking for some information that is linked to the updated address/location of the recipient, such as the cellphone number that is linked to this address, the current location as the scanning occurs, etc.

Another aspect of this invention is that the user sends out the request that may involve the desire for the MRC to be generated; the ALM is part of the process. The information of previous, current, and subsequent locations can be obtained through a variety of ways, for example, by the location tracking mechanism in the smart phone or in the ECRMA, by the recipient-initiated update process, etc.

Another aspect of this invention is to provide the flexibilities of defining the MRC code by either the sender or the recipient to allow different options of information access. Specific examples may include the use of the MRC code to allow access to one or more given physical addresses, as verified by the ECRMA used to access the MRC.

Another aspect of this invention is to provide a system and method to continuously update and modify the MRC, aided by various functionalities of the analytic functional module (AFM) providing analysis results from data collected in the entire delivery process from different categories of recipients after the sender has initiated this process.

In the case that the tangible deliverable is a parcel that allows to attach to it a chip, we call it an Internet of Things device (ITD), the tracking of the delivery and post-delivery activities can be continuous. Moreover, the communication between the ITD and the processing unit/ center is an ongoing process, ensuring continual modification of the tracking parameters, etc.

In summary this invention discloses a network communication system that includes a network processing station for receiving and converting electro-magnetic data transmitted through telecommunication network into a hybrid content deliverable object that comprises network transmissible content data files and a physically deliverable object for carrying out a hybrid delivery of the data files and the physically deliverable object by a physical delivery process and a network electro-magnetic delivery process from a sender to a recipient and an electronic content receiving/ managing apparatus (ECRMA). The physically deliverable object includes a chip as an Internet of Things device (ITD) embodies the data files and the physically deliverable object further includes a digitally readable machine-readable code (MRC) wherein the MRC further includes a three-dimensional address linked mechanism (ALM) for carrying out an ALM related verification of a physical address of the sender and a physical address of the recipient that includes a physical address including an altitude specific code in the MRC to allow the recipient to apply the machine readable code (MRC) to access the network transmissible content data files. The physically deliverable object is further attached with a near field communication (NFC) chip (NFCC) for continuously tracking the delivery and post-delivery activities by a wireless communication device disposed within a near-field distance; and the ECRMA is further implemented with an analytical module for collecting and analyzing the post-delivery activities associated with a designated category of recipients for generating and transmitting a recipient specific message corresponding to the designated category recipients to IDT delivered to the recipient.

In different embodiments, the analytical functional module for collecting and analyzing the data collected during the entire delivery processes associated with different designated category of recipients may be implemented in the network processing station or any communication nodes, The data processing and analytic functions to flexibly carry out the analytic functions to enhance the effective and precise delivery of messages with the deliverable objects to the designated categories of recipients may be achieved according to the data analysis results by the analytic functional modules implemented at different levels of the delivery processes.

Thus, the communication among the three delivery routes, the tangible with the ITD, the ECRMA and the MRC, are made available, continuous, and intelligent, with the integration of ALM among them.

BRIEF DESCRIPTION OF THE DRAWINGS

FIG. 1 is a system diagram for showing the steps performed by the hybrid method of delivering, through the telecommunication network (TN) and the delivery service, a physically deliverable object that embodies e-TC, or e-TC to an electronic content receiving/managing apparatus (ECRMA), or a tangible deliverable with the machine readable code (MRC). An Internet of the things (IoT) device (ITD) or near field communication (NFC) chip (NFCC) with the address-linked mechanism (ALM) is attached to the physically deliverable object. A tangible deliverable(s) with the machine-readable code (MRC) arrives to the recipient, and access to the MRC starts communication between the e-TC sender and recipient. A process center receives and processes the information from the various components of the process and interacts with the analytic functional module (AFM) functionalities.

DESCRIPTIONS OF PREFERRED EMBODIMENT

Figure 1:
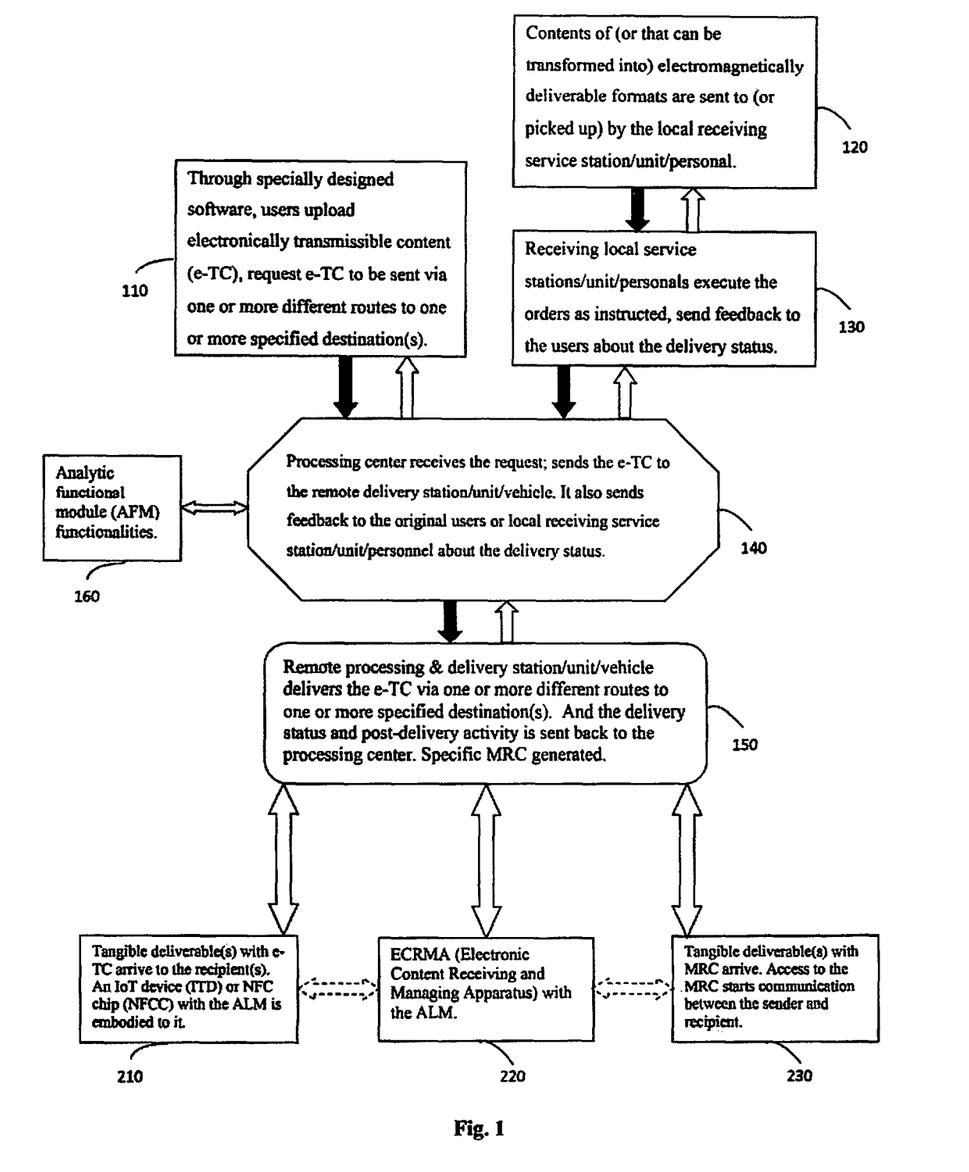

FIG. 1 is a system diagram for illustrating the processes according to an exemplary method of this invention. An electronic content sender for sending the electronic content through the hybrid content delivery system of this invention starts the process by uploading (Step 110) electronically transmissible content (e-TC) through a telecommunication network to a processing center (Step 140). Alternately, a user/sender may physically deliver a medium that embodies the said contents such as a letter or printed matter or pictures, or other contents that are ready for or can-be-converted to network or electro-magnetically transmissible content outbound to a local service station (Step 120), or may drop the contents in pick-up locations/boxes arranged by the service station. Alternatively, the local receiving station/unit in Step 120 and Step 130 can be an automated setup with which the conversion of non-digital format to digital format (e-TC format) can be accomplished, with the digital format be sent along to the recipient for its designated purpose. The local service station then executes the orders received from the user and sends a status report to the user to update the user about the content's delivery status. The processing center is enabled with the analytic functional module (AFM) functionalities (Step 160) which are continuously updated and upgraded based on the information from Step 140. The electro-magnetic transmissible content either uploaded or physically received by the processing center is sent to a remote delivery station through Internet or other methods of the telecommunication network (Step 140). In this step, the processing center further sends a status report to the user/sender about the reception and processing and delivery status of the content received.

Then the remote delivery station or a processing and delivery vehicle has different options to process the electronic content received from the telecommunication network, depending upon different delivery routes and different final destinations of the electronic contents. The processing and delivery station or vehicle first determine a delivery route and destination and sends a status report back to the electronic content sender about the status of the process and delivery (Step 150). The delivery and processing station or vehicle may convert the electronic contents into a physically deliverable item such as a printed letter, an advertisement printout, a photo album, a plastic card with magnetic storage strip or equivalent, a musical or video CD/DVD or its equivalent, or any deliverable object that embodies the magnetic media, optical media, and other types of medium as may be developed in the future.

The tangible deliverable will have a chip, we call it an Internet of Things device (ITD), attached to it. With the ITD, the tracking of the delivery and post-delivery activities can be continuous. Further, the communication between the ITD and the processing unit/center is an ongoing process, ensuring continual modification of the tracking parameters, etc.

Alternatively, the tangible deliverable will have a near field communication (NFC) chip (NFCC) attached to it. With the NFCC, the tracking of the delivery and post-delivery activities can be continuous through NFC of the NFCC with another device in the working distance of the NFCC. The other device to interact with the NFCC can be the cell phone of the delivery agent or the cellphone of the recipient of this tangible deliverable.

The physically deliverable items are then delivered to the recipients followed by a delivery status report sent back to the user (Step 210). In this case, the designated recipient receives the network or electro-magnetically transmissible content embodied in a physical deliverable item. The delivery of the physically deliverable item can be flexibly arranged according to the instructions provided by the user when sending the contents through the network upload (Step 110) or by physical delivery of the contents to a local service station (Step 120).

Additionally, the processing and delivery station or vehicle may transfer the electronic contents through telecommunication network to an electronic content receiving/managing apparatus (ECRMA) (Step 220) that may include a passive receiver device or a device to be able to access the email of the recipient, or any other network message receiving/managing apparatuses or devices.

Additionally, the processing and delivery station or vehicle may convert a part or whole of the electronic contents, as specified by the sender in Step 110 or Step 120 into a machine-readable code (MRC) in step 150 and send the MRC through telecommunication network to ECRMA (Step 220) or delivered to the designated recipient in tangible format (Step 230).

e-TC in the delivered tangible deliverable can then be sent and processed by sending the e-TC in the delivered tangible deliverable to an ECRMA (from Step 210 to Step 220). The e-TC embodied in the MRC can also be sent and processed to an ECRMA (from Step 230 to Step 220). There is a bi-directional e-TC and related information flow among any three of the processes of Steps 210, 220 and 230. The post-delivery activities of the e-TC can also be sent to the original sender via the route of 150, 140 and then to either 110 or 120.

The sender in Step 110 or Step 120 can request the three delivery modalities (Steps 210, 220 and 230) for delivery of the e-TC to be carried out at the same time, or in the combination of the available delivery routes, and in different sequence of the arrival time of the delivery.

In reality, the apparatus to carry out the functions of different steps in FIG. 1 can be either segregated in different locations or combined into a single physical setup. In the route from Step 110, the apparatus for Step 110, 140, 150 and 160 can be either segregated in different locations or combined into one or several physical setups. In the route from Step 120, the apparatus for Steps 120, 130, 140, 150 and 160 can be either segregated in different locations or combined into one or several physical setups.

Figure 2:
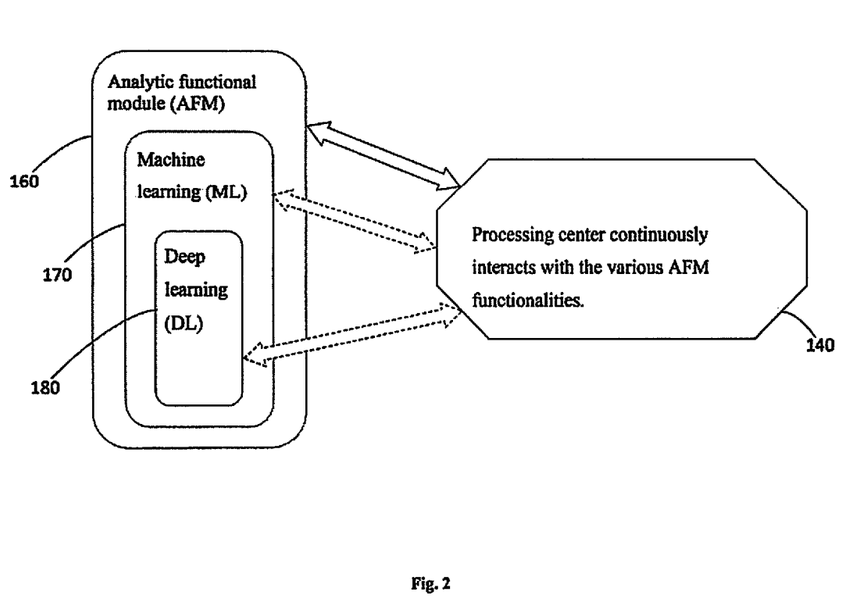
FIG. 2 shows the analytical functional modules that may be implemented in different nodes of the message and object delivery system with some of its components such as machine learning (ML) and deep learning (DL), and all the analytical functional module components may interact with the processing center continuously.

FIG. 2 shows the data analytic modules implemented with data analyses functions to accomplish machine learning (ML) and deep learning (DL), and all the data analytic modules may interact with the processing center continuously. The various data analytic modules are actively in an updating process based on their own technical improvement and on the information from the processing center which in turn collects information from the various components of the proposed system.

Figure 3:
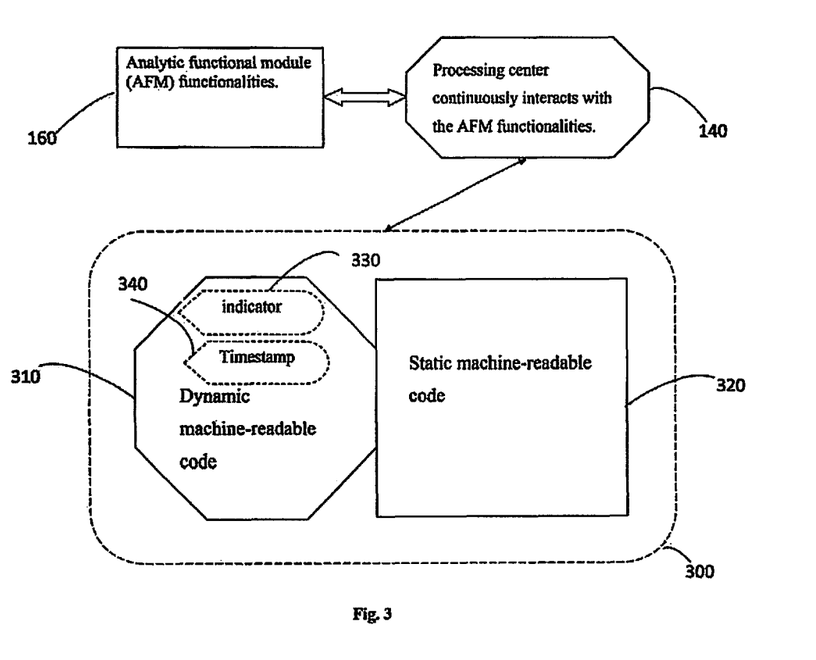
FIG. 3 shows the structure of a machine-readable code compound (MRCC) and its components, and the relationship of MRCC with the processing center and the analytical functional module.

FIG. 3 shows a machine-readable code compound (MRCC, 300) that is the basic unit of the machine-readable code (MRC) system in this invention. An MRCC is composed of at least a dynamic MRC (310) and a static MRC (320). The two components interact closely.

The dynamic MRC component has an indicator region (330) to show the dynamic information of this MRCC, such as the date and time of most recent information update, etc.

The indicator region can show its changed status with one or the combination of different digits, colors, contours, audio information or any other digitally-manageable formats.

This MRCC (300) also has a component for the timestamp (340). The timestamp component is added at the time the MRC is generated. Each time any update is added to the MRC either by the sender or the recipient of the MRC, the timestamp component is also updated. Therefore, each updated MRC is unique due to its specific timestamp and the associated contents at that specific time. This feature is useful for both the sender and recipient in analyzing the specific information of a given MRC in an MRC series originated from one MRC. The series of MRCs can be integrated into a blockchain to facilitate the use of the information contained.

The address-linked-mechanism (ALM), as described in FIG. 2 and FIG. 3 of the previous invention (U.S. Pat. No. 10,515,376 B2), is an integral part of the MRCC. The indicator region will constantly display the status of the ALM specific to this MRCC, such as whether the ALM is in good or approved status, last update of the ALM information, etc.

This MRCC (300) is connected with the processing center (140) which is enabled by all the available AFM functionalities (160) of this system. Thus, the dynamic MRC (310) can show personalized updated information either on the indicator region (330) and/or the timestamp (340).

Figure 4:
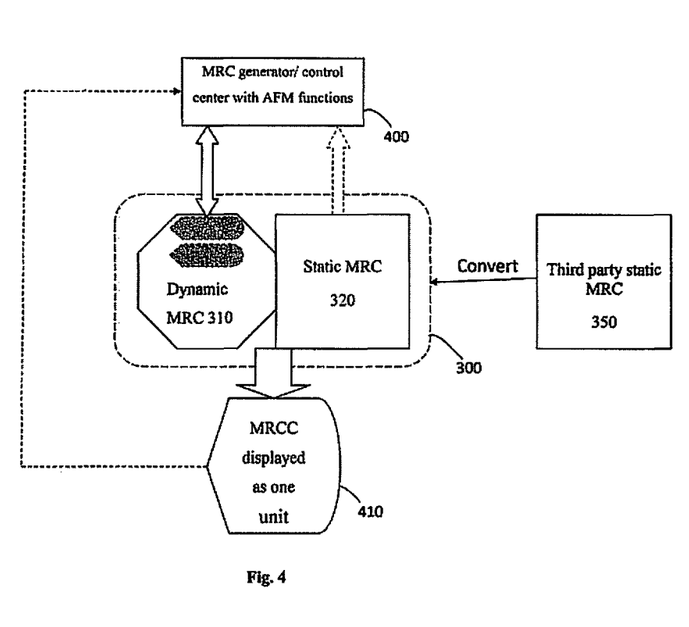
FIG. 4 shows the interaction of the machine-readable code compound (MRCC) with its control unit, the MRC generator (400) with AFM functions, and with its other display form (410), and the conversion of a third-party static MRC (350) that is converted into the MRCC of this invention.

FIG. 4 shows the three major components in the workflow of an MRC compound (MRCC). They are the AFM-enabled MRC generator (Step 400), the machine-readable code compound (MRCC, Step 300 which is the same as in FIG. 3) and a graphic user interface display code (Step 410).

Step 400 creates a new MRCC object, instantiates a new static MRC and dynamic MRC with values passed in.

Step 300 does data validation and passes in values into Step 400.

Step 410 consists of a graphic user interface display code and some action calling functions.

The dynamic MRC 310 is constantly in interaction with its control unit. The information of an access to the dynamic MRC including but not limited to the address-linked-mechanism (ALM) will be relayed to the MRC generator. Then 400 will enable the AFM-enabled response according to the set protocol.

Alternatively, an access to the static MRC 320 will also be relayed to 400. Then 400 will make the AI-enabled response according to the set protocol.

A user can access either the dynamic MRC 310 or the static MRC 320.

The difference in the interaction from the dynamic MRC or the static MRC with the AFM-enabled control center/MRC generator 400 is that the information flow is constant between the dynamic MRC and the AFM-enabled MRC generator (400) while the information flow is activated only when a static MRC is accessed.

When a machine-readable code compound (MRCC) is printed out or displayed, the printed-out or displayed form (410) can take the structure of either the original MRCC, i.e., a form with at least one dynamic MRC and one static MRC, or the MRCC can be converted through a special software program, into one special MRC code. When this MRCC-converted MRC is accessed—e.g., scanned with an ECRMA (electronic content receiving and/or managing apparatus), it will lead to the original MRCC. In the meantime, access to this MRCC-converted MRC (410) will also lead to the information relay to the AFM-enabled control center/MRC generator 400.

A third-party static MRC (350) can be converted into the MRCC 300 with a set protocol. The dynamic component 310 can be added or reserved after the static MRC 350 is converted into the MRCC 300. Though the MRCC can be displayed as one unit 410, it will have a static component and a dynamic component which may or may not have certain e-TC immediately after the conversion.

Figure 5:
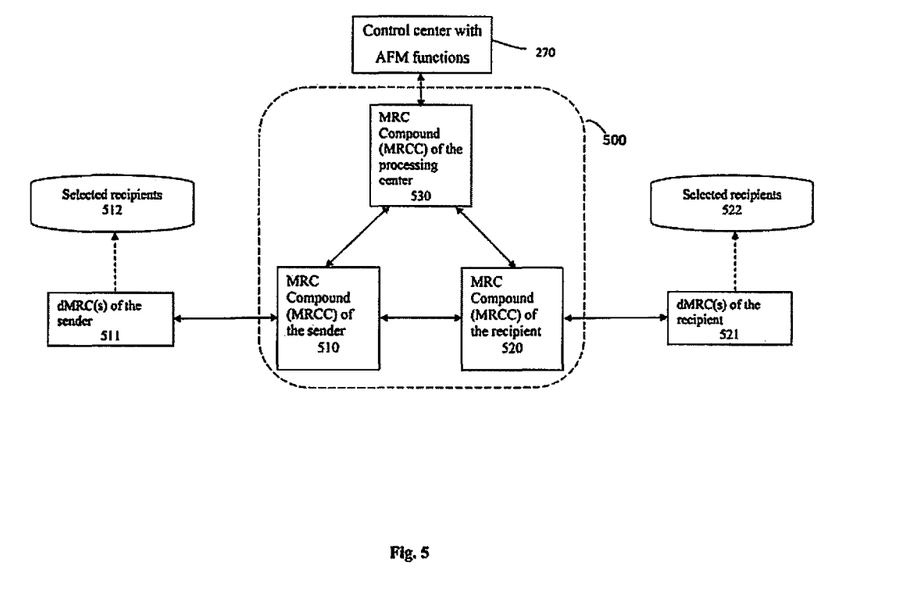
FIG. 5 shows the structure of a machine-readable code compound group (MRCCG) and its components, with the corresponding dMRC (derivative MRC) of the sender and the recipient, and the connection of MRCCG with the control center with analytical functional module.

FIG. 5 shows the structure of a machine-readable code compound group (MRCCG) and its components, with the corresponding dMRC (derivative MRC) of the sender and the recipient.

The unique MRCC of the sender (510) can yield a unique derivative MRC (dMRC) 511 which is a simpler form and can be obtained for general or public use. Similarly, the MRCC of the recipient (520) can yield a unique derivative MRC (dMRC) 521 which is a simpler form and can be obtained for general or public use. The dMRC may have only the information of the mailing address and generally has no information of the personal identification information (PII) or the biometric information (BI) of the recipient. However, the dMRC is linked to the higher level of the MRCC at that given address with more information, for example, the recipient's information such as the PII or the BI of the recipient. The e-TC recipient at a given mailing address can give the dMRC 521 with selected added information to someone. This is useful for social network wherein the connection will be 'by invitation only' from the dMRC with selected added information. Another use can be for a mailing address with more than one mail recipients, such as several people share a multiroom property and each person prefer to have his/her own unique MRC to receive mail or e-TC.

Each MRCC of the sender (510) or the recipient (520) can have multiple dMRCs as necessary and controlled by the sender or the recipient. The sender 511 or the recipient 521 can give one or multiple dMRC(s) to the selected recipient (512 or 522) as the sender (511) or the recipient (521) dictate.

Figure 6:
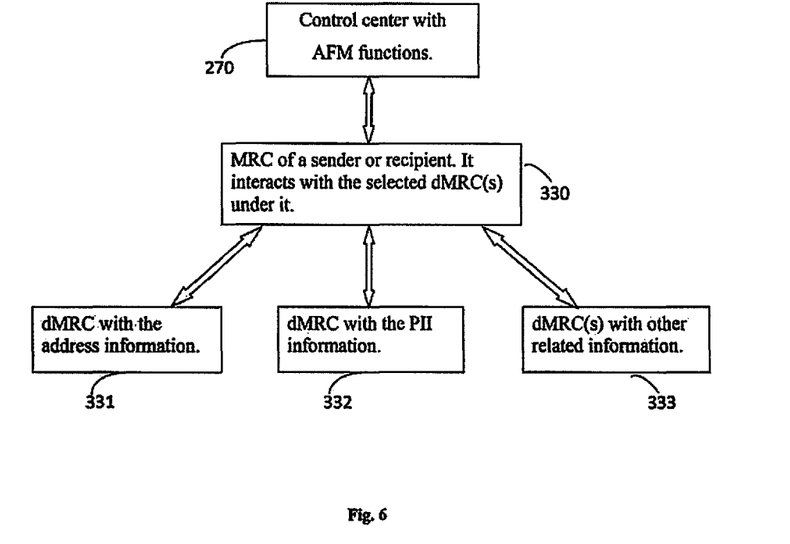
FIG. 6 shows the relationship of an MRC with the analytical functional module enabled Control Center and the relationship with its dMRCs. An MRC can have multiple dMRCs, one dMRC with the address information, one dMRC with the personal identification information (PII), and dMRCs with other related information.

FIG. 6 shows the relationship of an MRC (330) of a sender or recipient with the AFM-enabled Control Center 270 and the relationship of the MRC (330) with its corresponding dMRCs. An MRC 330 can have multiple dMRCs, one dMRC 331 with the address information related with the address linked mechanism (ALM), one dMRC 332 with the personal identification information (PII), and one or more dMRCs 333 with other related information.

When the MRC 330 is updated, the corresponding DMCs (331, 332 and 333) are also updated accordingly.

Figure 7:
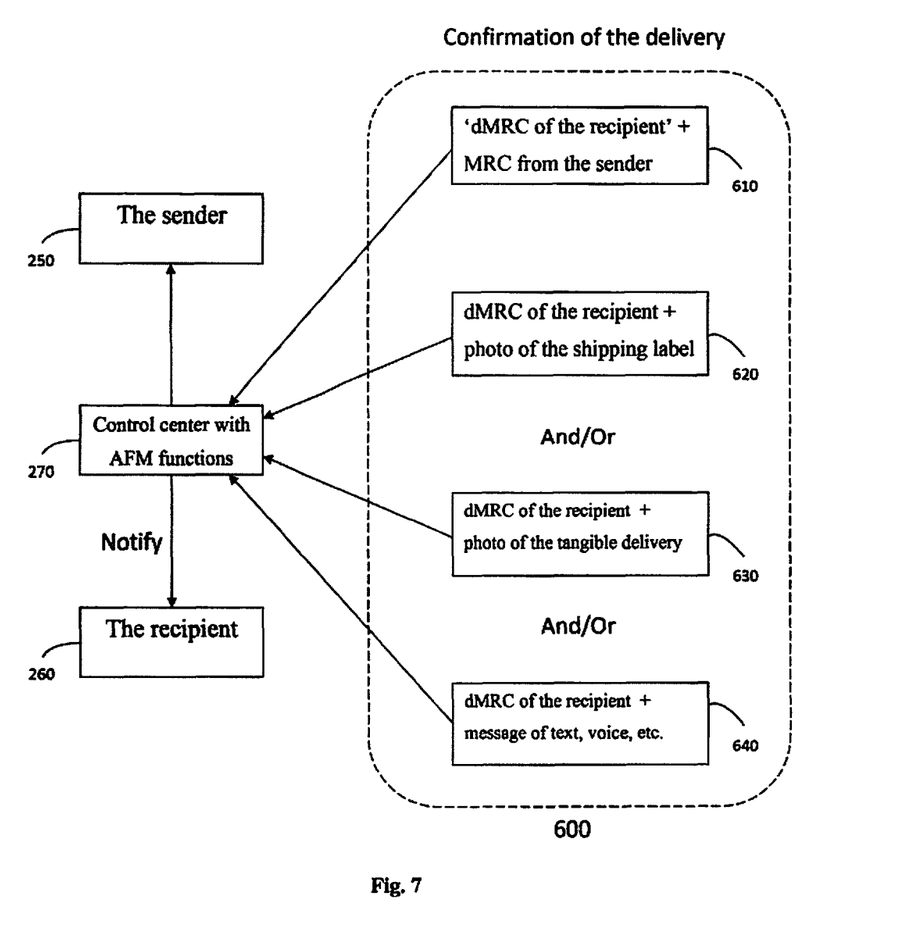
FIG. 7 shows how the derivative MRC (dMRC) is used in the confirmation process of a tangible delivery to the designated recipient, and to send the confirmation to the content sender and/or the content recipient.

FIG. 7 shows how the derivative MRC (dMRC) is used in the confirmation process of a tangible delivery to either the sender or the designated recipient.

When a tangible delivery (a letter, a parcel, etc.) arrives at the address or the delivery point of the designated recipient, the delivery person can access the dMRC by contacting the control center (270 in FIG. 5 and in FIG. 9) with the mailing address of the recipient (260). If the tangible delivery is from the sender (250) who already has the address-dMRC of the recipient 260, the real time information of the location of the recipient is added (process 600) and the resulted information (Step 610) is sent to the control center 270. If the tangible delivery (a letter, a parcel, etc.) is from another sender who does not have the address-dMRC of the recipient 260, the delivery person can access the address-dMRC by contacting the control center 270. Then the delivery person will add a photo of the shipping label (Step 620), and/or a photo of the tangible delivery (Step 630), and/or a message of text, voice, etc. (Step 640). Then the real time information of the location of the recipient is added (process 600) and the information is sent to the control center 270. The control center 270 then notifies the sender (250) for the confirmation of the tangible delivery. The control center 270 also notifies the recipient (260) the arrival of the tangible delivery; this is helpful when the recipient (260) is away from the physical address but can be informed of the delivery status from one or more ECRMA(s) of the recipient (260).

The application of dMRC(s) can be used in the case of a coupon which can be in a printed form or e-TC form. As the MRC with AFM functionalities in this invention facilitates the communication between the sender and the recipient, a dMRC of the coupon code and expiration code can also serve in this capacity.

Figure 8:
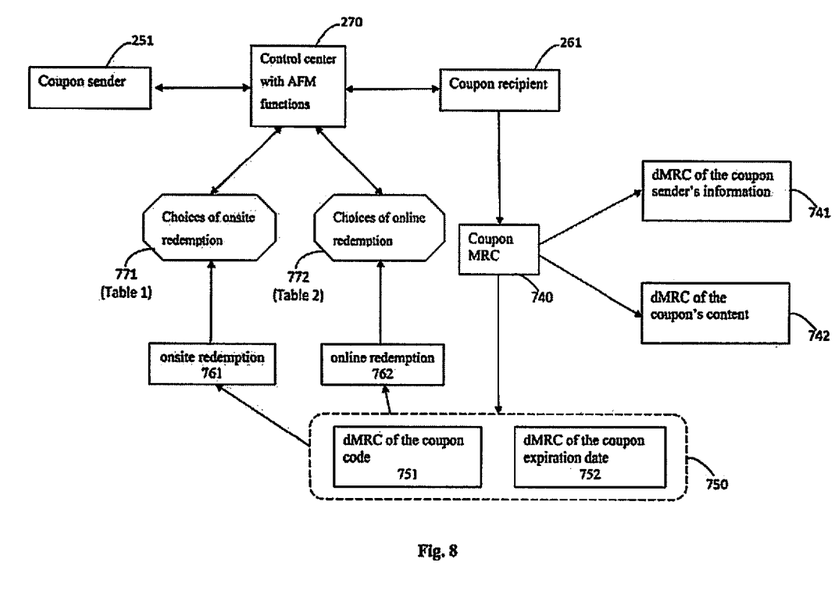
FIG. 8 shows the process enabled by the analytic functional module in which a coupon is sent to the recipient in the form of an MRC, and how the dMRC of the coupon code and the coupon expiration date are used in the various ways of onsite and online coupon redemption.

FIG. 8 shows the process in which a coupon is sent to the recipient in the form of an MRC (740), and how the dMRC of the coupon code and the coupon expiration date (Step 750) are used in the various ways of onsite (Step 771) and online (Step 772) coupon redemption.

When a coupon sender 251 sends the coupon in the e-TC content to the AI-enabled control center 270, the content can be converted to an MRC form by the AI-enabled control center. The MRC representing the corresponding content arrives to the recipient 261 through either e-TC form (220 in FIG. 1) or tangible form (230 in FIG. 1). The received coupon MRC 740 has several dMRCs. One dMRC represents the coupon code (751) and the coupon expiration date (752). One dMRC represents the coupon sender's information (741) and one dMRC represents the coupon's content (742).

The coupon code and expiration date dMRC of 750 can be accessed by the recipient 260 and manipulated in a variety of ways as set by the protocol set by the AFM-enabled control center 270 and allowed by the coupon sender 251. This capability will make the use of the coupon to be easier. One example is that the coupons expiration date (752) can be set so that a notifying signal is shown on the recipient's ECRMA as the expiration date/time gets close.

The coupon recipient 261 can redeem the coupon through either onsite redemption (761) or online redemption (762). In each of the two redemption routes, there is a process to select one or more redemption choices, as Step 771 for onsite redemption and Step 772 for online redemption. Some exemplary but not exhaustive choices of the redemption are listed in Table 1 (for Step 771) and Table 2 (for Step 772) below.

TABLE 1

Choices for onsite redemption (Step 771)

| Choice # | Choice process |
| --- | --- |
| 771-1 | Generate user-selected MRC format and/or customized coupon code usable at point of sale (POS). |
| 771-2 | Pre-POS redemption with credit given by sender 251 to recipient 261 |
| 771-3 | Pre-POS redemption with a given valid period |
| 771-4 | Pre-POS redemption with a recipient-selected form of payment. |
| 771-5 | Set up NFC transaction at POS. |
| 771-6 | Through an 'app' in a related app pool related to 771. |

TABLE 2

Choices for online redemption (Step 772)

| Choice # | Choice process |
| --- | --- |
| 772-1 | Complete the redemption with a recipient-selected form of payment. |
| 772-2 | Complete the redemption with a given grace period |
| 772-3 | Through an 'app' in a related app pool related to 772. |

Figure 9:
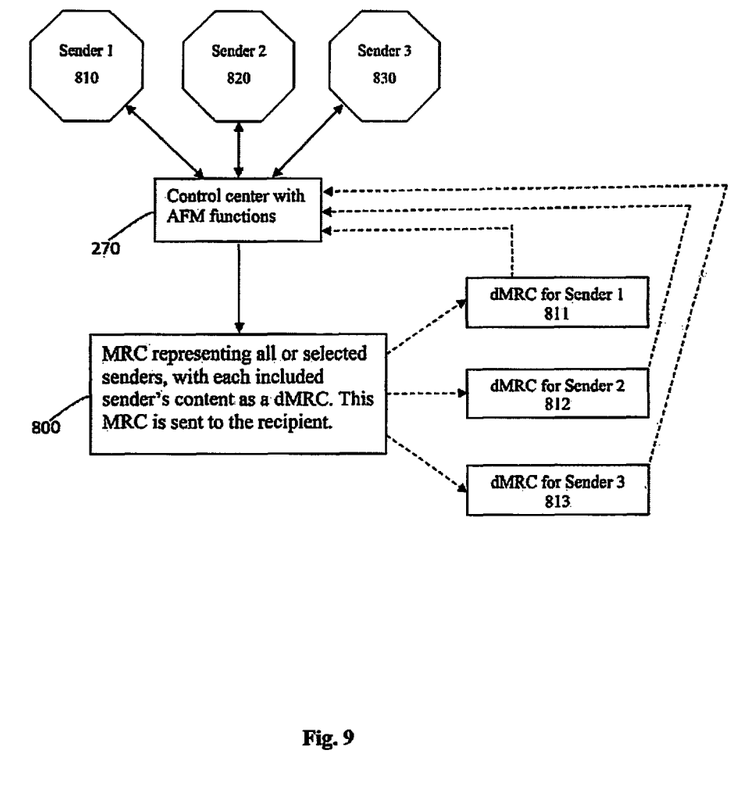
FIG. 9 shows process enabled by the analytic functional module to present the contents from multiple senders on a single MRC that is correspondent to the dMRC for each sender.

FIG. 9 shows how the contents from multiple senders are represented by a single MRC with corresponding dMRC for each sender.

It frequently happens that a recipient receives the incoming 'mails' or contents from multiple senders. And it is more convenient to the recipient that the incoming contents are simplified and delivered in one single MRC while the content from each sender can still be individually accessed and manipulated. This can also save the natural resources in the case of printed mail such as in direct mails.

The AFM-enabled control center (270) combines the contents from multiple senders (810, 820 and 830) and represents the contents from all or selected senders in an MRC (800), with each included sender's content as a dMRC of MRC 800. The dMRC 811 represents the contents from sender 810, the dMRC 812 represents the contents from sender 820, and the dMRC 813 represents the contents from sender 830. Access to a given dMRC will connect the recipient, through the AFM-enabled control center 270, to the corresponding sender, e.g., access to dMRC 812 will connect the recipient to sender 820, thus establishing the communication between the recipient to the corresponding sender.

Frequently a given recipient may show a pattern to access (as the number of clicks or the access time, etc.) the giving information from a particular sender, e.g., a recipient shows more access to dMRC 812. The AFM-enabled control center (270) recognizes this pattern and the system 'learns' to set this pattern as the preferred pattern for this given recipient. Relevant information such as other related dMRCs and the access route are set to be presented to this recipient on the next access, or are set to be included and sent in an MRC with the personalized information to this recipient.

Although the present invention has been described in terms of the presently preferred embodiment, it is to be understood that such disclosure is not to be interpreted as limiting. Various alternations and modifications will no doubt become apparent to those skilled in the art after reading the above disclosure. Accordingly, it is intended that the appended claims be interpreted as covering all alternations and modifications as fall within the true spirit and scope of the invention.

I claim:

1. A network communication system comprising:
a network processing station for receiving and converting electro-magnetic data transmitted through telecommunication network into a hybrid content deliverable object that comprises network transmissible content data files and a physically deliverable object for carrying out a hybrid delivery of the data files and the physically deliverable object by a physical delivery process and a network electro-magnetic delivery process from a sender to a recipient and an electronic content receiving/managing apparatus (ECRMA);
the physically deliverable object includes a chip as an Internet of Things device (ITD) embodies the data files and the physically deliverable object further includes a digitally readable machine-readable code (MRC) wherein the MRC further includes a three-dimensional address linked mechanism (ALM) for carrying out an ALM related verification of a physical address of the sender and a physical address of the recipient that includes a physical address including an altitude specific code in the MRC to allow the recipient to apply the machine readable code (MRC) to access the network transmissible content data files,
the physically deliverable object is further attached with a near field communication (NFC) chip (NFCC) for continuously tracking the delivery and post-delivery activities by a wireless communication device disposed within a near-field distance; and
the ECRMA is further implemented with an analytical module for collecting and analyzing the post-delivery activities associated with a designated category of recipients for generating and transmitting a recipient specific message corresponding to the designated category recipients to IDT delivered to the recipient.

2. The network communication system of claim 1 wherein:
the ALM related verification of the physical address including the altitude of the recipient further enables a linking between the sender and recipient under the control of the network communication system, and wherein the wireless communication device disposed within a near-field distance is a cellular phone.

* * * * *